H. M. VOTER.
ANIMAL TRAP.
APPLICATION FILED MAR. 9, 1909.
936,836.
Patented Oct. 12, 1909.
2 SHEETS—SHEET 1.
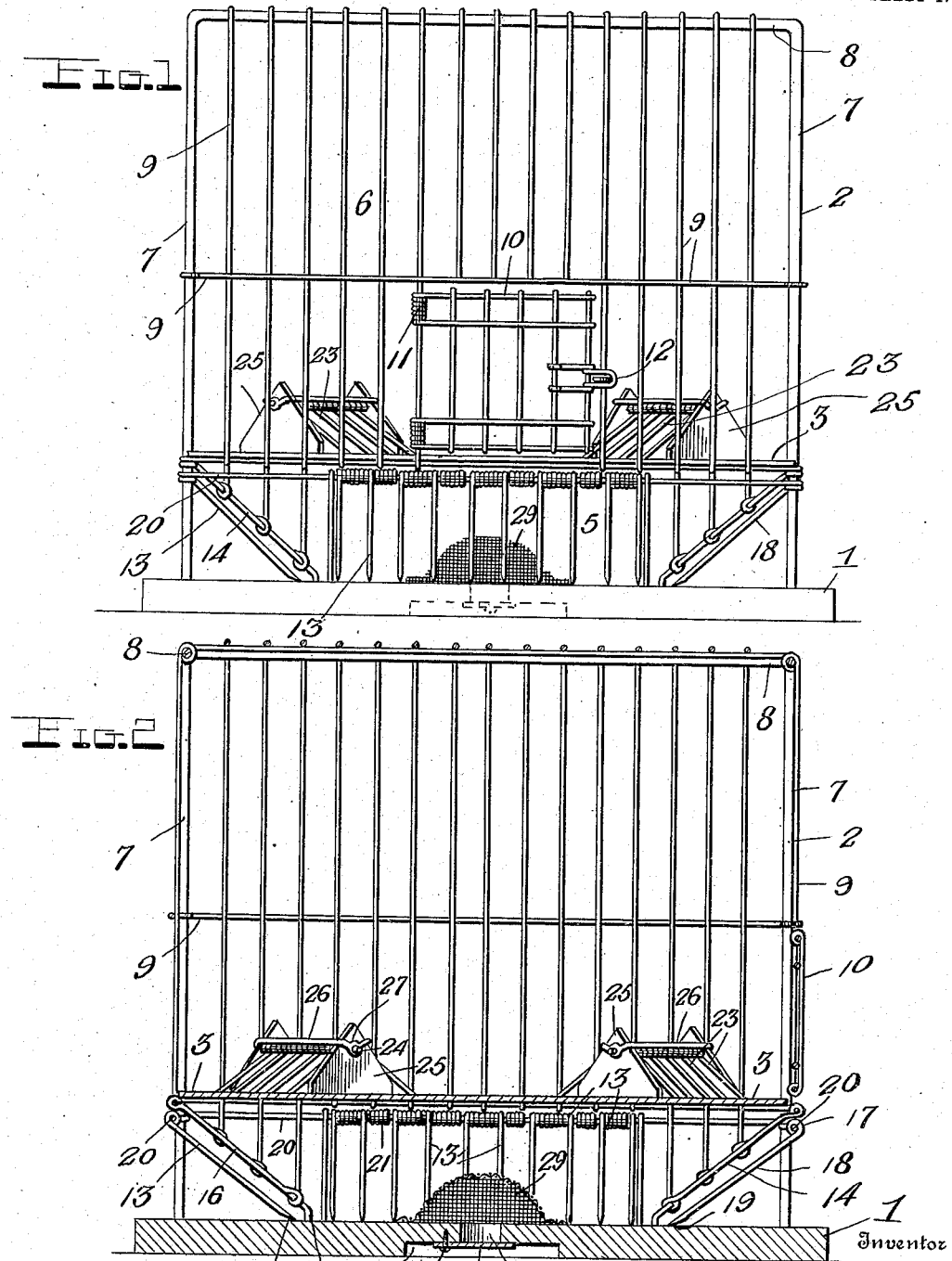

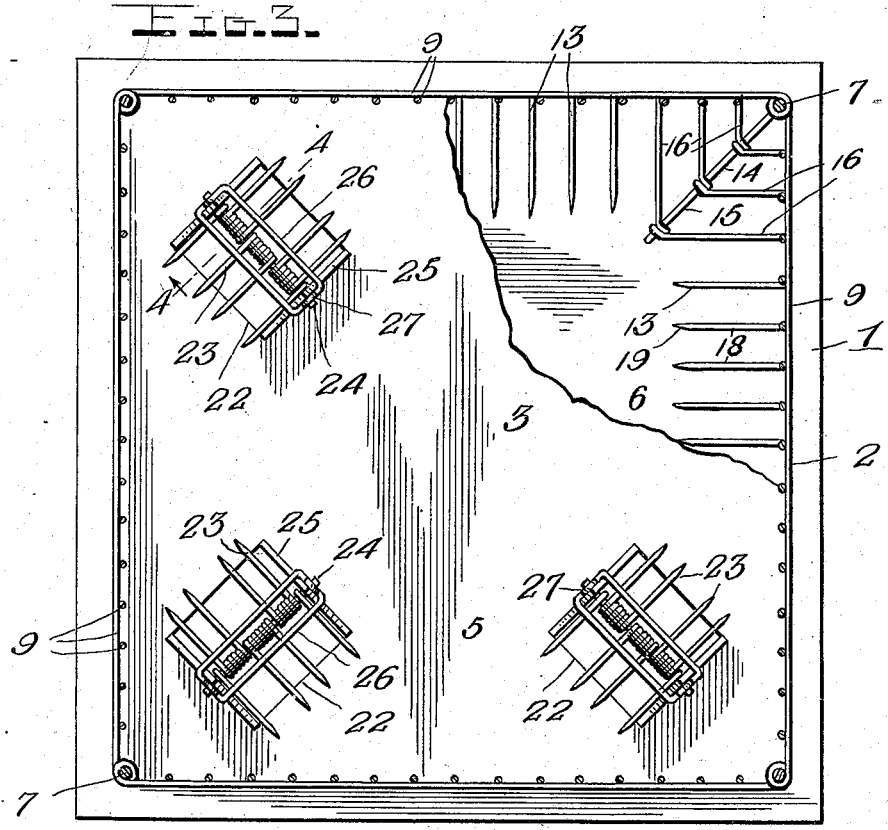
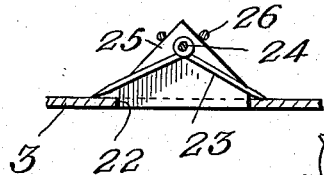
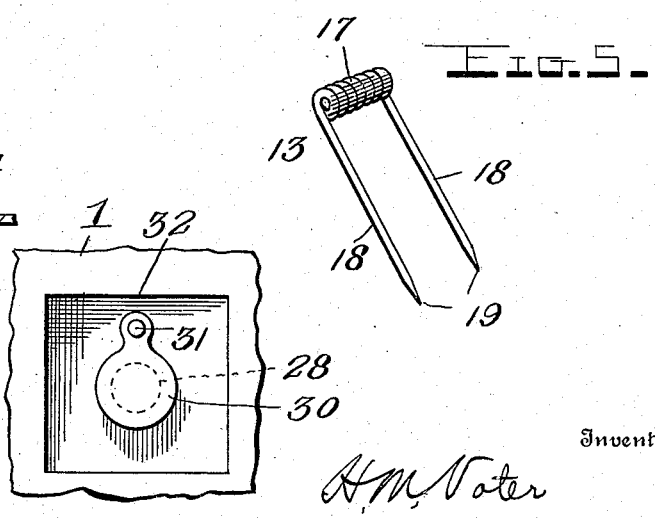

UNITED STATES PATENT OFFICE.

HARRY M. VOTER, OF BOWDON, NORTH DAKOTA.

ANIMAL-TRAP.

936,836.  Specification of Letters Patent.  Patented Oct. 12, 1909.

Application filed March 9, 1909. Serial No. 482,252.

*To all whom it may concern:*

Be it known that I, HARRY M. VOTER, a citizen of the United States, residing at Bowdon, in the county of Wells and State of North Dakota, have invented certain new and useful Improvements in Animal-Traps, of which the following is a specification, reference being had to the accompanying drawings.

This invention relates to improvements in animal traps.

The object of the invention is to provide a simple and inexpensive trap into which a rat or other animal may easily enter and from which escape will be practically impossible.

With the above and other objects in view, the invention consists of the novel features of construction and the combination and arrangement of parts hereinafter fully described and claimed, and illustrated in the accompanying drawings, in which—

Figure 1 is a front elevation of the improved trap; Fig. 2 is a vertical front to rear sectional view; Fig. 3 is a horizontal section with parts broken away; Fig. 4 is a detail vertical section taken on the plane indicated by the line 4—4 in Fig. 3; Fig. 5 is a detail perspective of one of the pivoted doors; and Fig. 6 is a detail bottom plan view of the central portion of the base of the trap.

The improved trap comprises a base 1 for supporting a wire housing 2 which is divided by a horizontal partition 3 into lower and upper chambers or compartments 5, 6. The open housing 2 of the trap is preferably of rectangular shape, as shown, and consists of a frame having four corner posts 7 rising from the base 1 and united by upper connecting bars 8. The top of the frame 2 and the four sides of the upper compartment 6 may be covered with woven wire or a wire grating 9 of any form and construction which will not permit the animals to escape after they have been caught. However, to permit the animals to be removed from the upper compartment 6, a suitable open portion is formed in the front wall of the same and closed by a wire door 10 hinged, as shown at 11, and also provided with a suitable fastening 12.

The lower compartment 5 of the trap has on its four sides inwardly swinging trap doors 13 and at its four corners rigid open work portions 14 which close the space between the endmost doors 13 on adjacent sides of the trap. Each of the corner structures 14 consists of a downwardly and inwardly inclined rod 15 extending from one of the corners of the horizontal partition 3 to the base 1, and upwardly and outwardly inclined wires 16 which extend from the rod 15 to the side walls of the trap, as clearly shown in Figs. 2 and 3. A plurality of the pivoted or hinged doors 13 is arranged on each side of the trap and each of said doors is preferably formed from a single piece of wire by coiling its central portion, as shown at 17, to provide a pivot eye and having its ends 18 disposed in spaced parallel relation and pointed, as shown at 19. The pivot eyes 17 of the several doors 13 are rotatable upon horizontal pivot rods or wires 20 stretched from corner post to corner post at a point slightly below the horizontal partition 3 and the ends or arms 18 of the wire doors are of such length that they incline downwardly and inwardly from the pivots 20 and have their points 19 resting upon the base 1. The adjacent doors 13 on each side of the trap are spaced apart by wire coils 21 so that all of the parts 18 will be disposed at substantially the same distance apart. By constructing the trap doors 13 in this manner, it will be seen that a rat or other animal may readily lift one or more of said doors and enter the lower compartment 5 of the trap, and that the instant the animal passes beneath such door or doors they will drop by gravity to closed position. Owing to the pointed ends 19 of the door members 18, it will be seen that the animal will be impeded by such points the instant it attempts to pass beneath the doors and out of the compartment 5.

The upper compartment 6 is provided for the purpose of receiving the animals caught in the lower compartment 5 and to prevent their return to the latter. To permit the animals to enter the compartment 6, openings 22 are formed in the partition 3, which latter is preferably made of sheet metal. Said openings 22 are preferably arranged adjacent to the four corners of the partition so that the animals in the lower compartment may readily climb up the angular inclined corner structures 14 and pass through the openings 22 into the upper compartment. For the purpose of preventing the return of the animals to the lower compartment, trap doors 23 are provided for the openings 22. Said doors 23 are formed from single pieces of wire similar to the doors 13 shown in Fig. 5, and two sets or series of them are arranged over each of the openings 22. The pivot collars of these doors 23 hang from a horizontal pivot pin or rod 24 so that the doors of the two series incline downwardly and outwardly in opposite directions, as shown more clearly in Fig. 4. The pivots 24 for the doors 23 are supported in upright brackets 25 formed preferably by bending upwardly portions of the metal which are removed from the partition 3 to form the openings 22. To prevent the doors from swinging from one side of the openings 22 over upon the other side of the same, horizontal guard rods 26 are provided above the inner portions of the doors of each series. Said guards 26 have their ends bent around the brackets 25 and formed with eyes 27 to receive the pivot pins 24, whereby they are retained upon the brackets 26 and also serve to brace the same.

The bait used to lure the animals into the trap is placed in the center of the lower compartment 5 through a central opening 28 in the base 1. To prevent the bait from being eaten up by the first animal entering the trap, a woven wire guard or shield 29 is arranged over the top of the opening 28. Said guard 29 is of substantially semispherical form and has a surrounding flange secured to the top of the base 1. To close the bottom of the opening 28, a plate 30 is pivoted at 31 in a recess 32 formed in the under face of the base, as clearly shown in Figs. 2 and 6 of the drawings.

The operation of the invention will be readily understood from the foregoing description taken in connection with the accompanying drawings, and it is, therefore, thought that further explanation is unnecessary.

Having thus described the invention what is claimed is:

1. An animal trap comprising upper and lower compartments separated by a horizontal partition, the upper compartment having angularly disposed sides and the partition having openings adjacent to the corners of said upper compartment, trap doors closing the several sides of the lower compartment, downwardly and inwardly inclined, angular corner structures closing the corners of the lower compartment between the ends of the several trap doors, said angular corner structures being disposed adjacent to the openings in the partition, whereby animals may climb up the corner structures and through the openings in the partition and into the upper compartment and means for preventing the return of the animals from the upper to the lower compartment.

2. An animal trap comprising a base, an open frame consisting of corner posts rising from the base and united by upper connecting bars, a horizontal partition arranged upon said posts and spaced from the base to provide upper and lower compartments, a covering over the upper portion of the frame to close the upper compartment, said partition being formed adjacent its corners with openings, trap doors closing the last mentioned openings to prevent the return of animals from the upper to the lower compartment, trap doors closing the several sides of the lower compartment and angular downwardly inclined corner structures closing the corners of the lower compartment between the trap doors of the several sides of the same.

3. An animal trap comprising a horizontal plate formed with an opening, means for supporting and inclosing said plate, upright brackets arranged on opposite sides of said opening and apertured, a horizontal pivot rod arranged in the apertures of said brackets and disposed centrally over said opening in the plate, oppositely and downwardly swinging trap doors hung from said pivot rods and having pointed lower ends adapted to rest on said plate, the ends of said pivot rod projecting beyond the outer faces of said brackets, and horizontally extending stop rods arranged across said brackets above the doors and having their ends bent around and attached to the projecting ends of said pivot rod to retain the latter in the brackets to strengthen said brackets.

In testimony whereof I hereunto affix my signature in the presence of two witnesses.

HARRY M. VOTER.

Witnesses:
 HENRY F. KONICHEK,
 A. E. MORTON.